(12) United States Patent
Hu et al.

(10) Patent No.: US 8,346,301 B2
(45) Date of Patent: Jan. 1, 2013

(54) CALLING METHOD, DEVICE, AND SYSTEM

(75) Inventors: Haihua Hu, Shenzhen (CN); Weili Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 594 days.

(21) Appl. No.: 12/556,400

(22) Filed: Sep. 9, 2009

(65) Prior Publication Data

US 2010/0144343 A1 Jun. 10, 2010

(30) Foreign Application Priority Data

Dec. 9, 2008 (CN) .......................... 2008 1 0218367

(51) Int. Cl.
*H04M 1/00* (2006.01)

(52) U.S. Cl. ..... 455/556; 455/456; 455/433; 455/412.1; 455/412.2; 455/413; 455/414.1; 455/415; 455/432.2; 455/558; 370/331; 370/216; 370/329; 370/433; 370/325

(58) Field of Classification Search ................... 455/456, 455/433, 412.1, 412.2, 413, 414.1, 415, 432.2, 455/558; 370/331, 216, 329, 433, 325
See application file for complete search history.

(56) References Cited

U.S. PATENT DOCUMENTS

| | | | | |
|---|---|---|---|---|
| 7,330,725 | B2* | 2/2008 | Zabawskyj et al. | ........ 455/432.1 |
| 2006/0205404 | A1 | 9/2006 | Gonen et al. | |
| 2007/0259663 | A1* | 11/2007 | Weintraub et al. | ............ 455/433 |
| 2008/0108347 | A1* | 5/2008 | Jiang | ............................ 455/433 |

FOREIGN PATENT DOCUMENTS

| | | |
|---|---|---|
| CN | 1671166 A | 9/2005 |
| CN | 1929685 A | 3/2007 |
| CN | 101014198 A | 8/2007 |

OTHER PUBLICATIONS

1st Office Action in corresponding Chinese Patent Application No. 200810218367.5 (Jul. 3, 2012).

* cited by examiner

*Primary Examiner* — Joseph Arevalo

(74) *Attorney, Agent, or Firm* — Leydig, Voit & Mayer, Ltd.

(57) ABSTRACT

A calling method, device and system are disclosed. The calling method includes: obtaining, by a service platform, subscription information of a roaming prepaid subscriber, modifying and sending the modified subscription information to a visited mobile switching center (VMSC) of the roaming prepaid subscriber so that a call initiated by the roaming prepaid subscriber could be triggered to the service platform by the VMSC; receiving, by the service platform, the call to a called subscriber initiated by the roaming prepaid subscriber and triggered by the VMSC; and instructing, by the service platform, the VMSC to release the call and instructing a call connection device to connect the roaming prepaid subscriber to the called subscriber after determining from the call that the roaming prepaid subscriber has activated a callback service. User operation is simplified and user's experience is improved with the method, device and system in accordance with the embodiments of the invention.

8 Claims, 4 Drawing Sheets

CALLING METHOD, DEVICE, AND SYSTEM

CROSS-REFERENCE TO RELATED APPLICATIONS

The present application claims the priority of Chinese Patent Application No. 200810218367.5, submitted to the Chinese Patent Office on Dec. 9, 2008, and titled "Calling Method, Device, and System," which is incorporated herein by reference in its entirety.

FIELD OF THE INVENTION

This invention relates to the field of communication, more particularly, to a calling method, device and system.

BACKGROUND

As a natural result of economical globalization, the range of human activity is getting larger and larger, and the demand for international roaming communication is increasing accordingly. Since a prepaid subscriber subscribes to a Service Control Point (SCP) in his/her home country, the subscriber may not be triggered to his/her subscribed SCP in an international roaming condition when he/she roams out of his home country to other countries, which leads to a failure of the international roaming calling service.

A method generally taken in the related art as a solution to the above problem comprises: a prepaid calling subscriber initiating a call; prefixing the called number with an Unstructured Supplementary Service Data (USSD); routing the call to the subscribed SCP of the calling subscriber; triggering the SCP to initiate a two-segment call to the calling subscriber and to the called subscriber, respectively; and joining the two-segment call to realize the calling call of the prepaid subscriber in the roamed country.

The inventor found out in implementing the invention that in the related art, when a prepaid subscriber initiates a call as the calling party in the roamed country, he/she needs to dial the USSD prefix before the called number in order to make a call, and the numbers in the original contact book could not be used for calling unless they are supplemented with the USSD prefix, which results in complex and inconvenient operations.

SUMMARY OF THE INVENTION

Therefore, various embodiments of the invention are directed to providing a calling method for simplifying subscriber's operation.

An embodiment of the invention provides a calling method. The method includes: obtaining, by a service platform, subscription information of a roaming prepaid subscriber, modifying the subscription information, and sending the modified subscription information to a visited mobile switching centre (VMSC) of the roaming prepaid subscriber so that a call initiated by the roaming prepaid subscriber could be triggered to the service platform by the VMSC; receiving, by the service platform, the call to a called subscriber initiated by the roaming prepaid subscriber and triggered by the VMSC; and after determining from the call that the roaming prepaid subscriber has activated a callback service, instructing, by the service platform, the VMSC to release the call, and instructing a call connection device to connect the roaming prepaid subscriber to the called subscriber.

An embodiment of the present invention further provides a service platform. The service platform includes: a subscription information modifying unit configured to obtain subscription information of a roaming prepaid subscriber and modify the subscription information; a subscription information sending unit configured to send the modified subscription information to a visited mobile switching centre (VMSC) of the roaming prepaid subscriber so that a call initiated by the roaming prepaid subscriber could be triggered to a call receiving unit by the VMSC; the call receiving unit configured to receive the call to a called subscriber initiated by the roaming prepaid subscriber and triggered by the VMSC; a callback service determining unit configured to determine, from the call, that the roaming prepaid subscriber has activated a callback service; and a call processing unit configured to instruct the VMSC to release the call initiated by the roaming prepaid subscriber and instructing a call connection device to connect the roaming prepaid subscriber to the called subscriber, after it is determined that the pre-paid roaming subscriber has activated the callback service.

An embodiment of the present invention further provides 1) a calling system, comprising: a service platform configured to obtain subscription information of a roaming prepaid subscriber, modify the subscription information, send the modified subscription information to a visited mobile switching centre (VMSC) of the roaming prepaid subscriber so that a call initiated by the roaming prepaid subscriber could be triggered to the service platform by the VMSC, receive the call to a called subscriber initiated by the roaming prepaid subscriber and triggered by the VMSC, and instruct the VMSC to release the call initiated by the roaming prepaid subscriber and instructing a call connection device to connect the roaming prepaid subscriber to the called subscriber after determining that the roaming prepaid subscriber has activated a callback service; and 2) a visited mobile switching centre (VMSC) of the roaming prepaid subscriber configured to receive the call initiated by the roaming prepaid subscriber, trigger the call to the service platform according to the subscription information of the roaming prepaid subscriber, and release the call according to a received instruction sent by the service platform.

In the embodiments of the present invention, user operation is simplified and user experience is improved in such a way that the service platform modifies the obtained subscription information of the roaming prepaid subscriber and sends it to the VMSC of the roaming prepaid subscriber such that when the roaming prepaid subscriber initiates the call to a called subscriber, the VMSC can trigger it to the service platform according to the subscription information of the roaming prepaid subscriber, and then the service platform can instruct a call connection device to connect the roaming prepaid subscriber to the called subscriber.

DETAILED DESCRIPTION OF THE EMBODIMENTS

In the following, the present invention will be described in detail with reference to the accompanying drawings and specific embodiments in order to provide a clearer understanding of the objects, technical solutions and advantages of the present invention.

Figure 1:
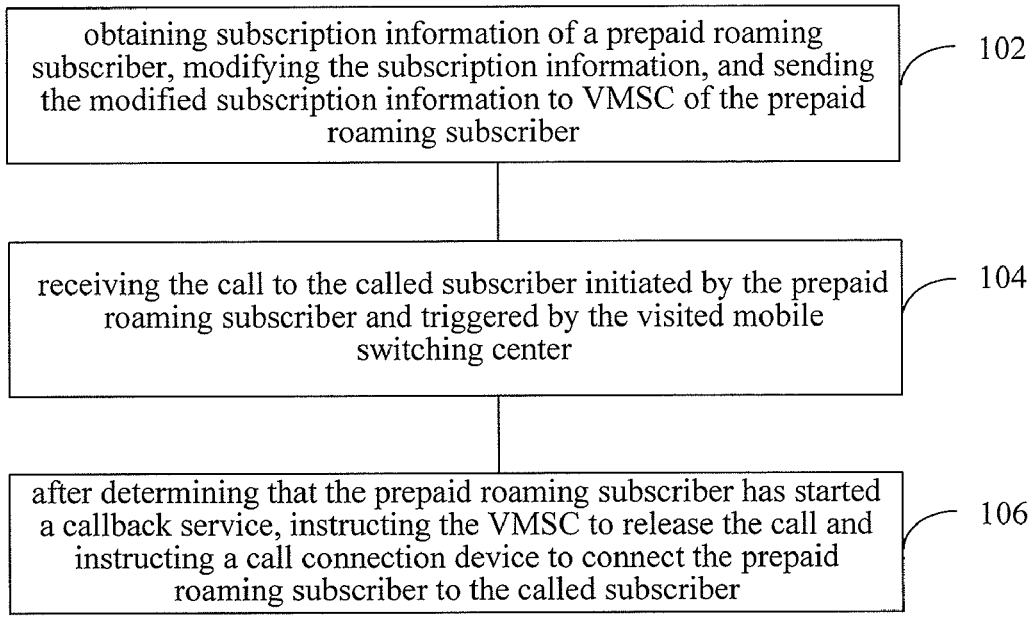
FIG. 1 schematically shows the flow of a calling method according to an embodiment of the present invention.

The embodiments of the present invention provide a calling method. As shown in FIG. 1, the calling method includes the following steps:

102. A service platform obtains subscription information of a roaming prepaid subscriber, modifies the subscription information, and sends the modified subscription information to a visited mobile switching centre (VMSC) of the roaming prepaid subscriber so that a call initiated by the roaming prepaid subscriber could be triggered to the service platform by the VMSC.

The service platform may obtain the subscription information of the roaming prepaid subscriber by monitoring and intercepting location update information of the roaming prepaid subscriber, and then modifies the subscription information, e.g., the subscription information may be Customized Applications for Mobile Network Enhanced Logic (CAMEL) Subscription Information. Specifically, a SCP address (gsmSCF Address) to which a service contained in the subscriber's subscription information belongs may be modified to the address of the service platform so that the subscriber's subscription information points to the service platform. In addition, the modified subscription information may be sent to the VMSC of the roaming prepaid subscriber through an Insert Subscriber Data (ISD) message so that the VMSC of the roaming prepaid subscriber could trigger a call initiated by the roaming prepaid subscriber to the service platform.

104. The service platform receives the call to a called subscriber initiated by the roaming prepaid subscriber and triggered by the VMSC.

106. The service platform instructs the VMSC to release the call and instructs a call connection device to connect the roaming prepaid subscriber to the called subscriber when it is determined from the call that the roaming prepaid subscriber has activated a callback service.

In the embodiments of the present invention, user operation is simplified and user experience is improved in such a way that the service platform modifies the obtained subscription information of the roaming prepaid subscriber and sends it to the VMSC of the roaming prepaid subscriber so that when the roaming prepaid subscriber initiates a call to the called subscriber, the VMSC can trigger the subscription information of a roaming prepaid subscriber to the service platform and then the service platform can instruct a call connection device to connect the roaming prepaid subscriber to the called subscriber.

Figure 2:
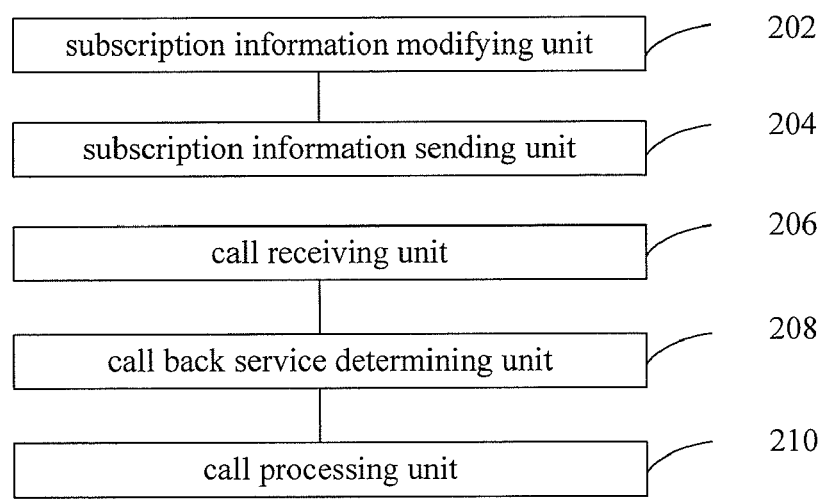
FIG. 2 schematically shows the structure of a service platform according to an embodiment of the present invention.

The embodiments of the present invention further provide a service platform. As shown in FIG. 2, the service platform includes a subscription information modifying unit 202, a subscription information sending unit 204, a call receiving unit 206, a callback service determining unit 208, and a call processing unit 210.

The subscription information modifying unit 202 is configured to obtain and modify subscription information of a prepaid roaming user.

The subscription information sending unit 204 is configured to send the modified subscription information to the visited mobile switching centre (VMSC) of the roaming prepaid subscriber so that the VMSC can trigger the call initiated by the roaming prepaid subscriber to the call receiving unit.

The call receiving unit 206 is configured to receive the call to the called subscriber initiated by the roaming prepaid subscriber and triggered by the VMSC.

The callback service determining unit 208 is configured to determine, from the call received by the call receiving unit 206, that the roaming prepaid subscriber has activated a callback service.

The call processing unit 210 is configured to instruct the VMSC to release the call initiated by the roaming prepaid subscriber and instruct a connection device to connect the roaming prepaid subscriber to the called subscriber when it is determined that the roaming prepaid subscriber has activated the callback service.

Figure 3:
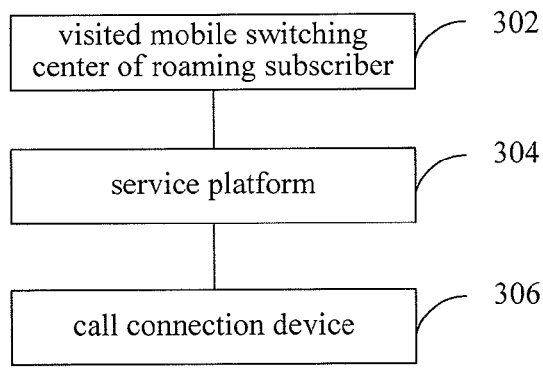
FIG. 3 schematically shows the structure of a calling system according to an embodiment of the present invention.

The embodiments of the present invention further provide a calling system. As shown in FIG. 3, the calling system includes a service platform 304, and a visited mobile switching centre (VMSC) 302 of a roaming prepaid subscriber.

The service platform 304 is configured to: obtain subscription information of the roaming prepaid subscriber; modify the subscription information and send the modified subscription information to the visited mobile switching centre (VMSC) 302 of the roaming prepaid subscriber so that a call initiated by the roaming prepaid subscriber could be triggered to the service platform 304 by the VMSC 302; receive the call to a called subscriber initiated by the roaming prepaid subscriber and triggered by the VMSC 302 and instruct the VMSC 302 to release the call initiated by the roaming prepaid subscriber; and instruct a call connection device to connect the roaming prepaid subscriber to the called subscriber when it is determined from the received call that the roaming prepaid subscriber has activated a callback service.

The visited mobile switching centre (VMSC) 302 of the roaming prepaid subscriber is configured to receive the call initiated by the roaming prepaid subscriber, trigger the call to the service platform 304 according to the subscription information of the roaming prepaid subscriber, and release the call according to an instruction received from the service platform 304.

Referring to FIG. 3 again, optionally, the calling system provided by the above embodiment may further include a call connection device 306. The call connection device 306 is configured to establish a callback call for the roaming prepaid subscriber and the called subscriber, respectively, in accordance with an instruction received from the service platform 304. The call connection device may be IVR or other devices which can perform call connection.

The above embodiments may be applied to mobile network, such as Global System for Mobile Communications (GSM), Code Division Multiple Access (CDMA), and Wideband CDMA (WCDMA), and bridging of the two-segment call of the calling segment and the called segment may be realized by an Interactive Voice Response System (IVR) or a Service Switching Point (SSP). To have a better understanding of the above embodiments, an example will be taken in the following where the above embodiments are applied to a GSM network in which the call bridging is realized by an IVR.

Figure 4:
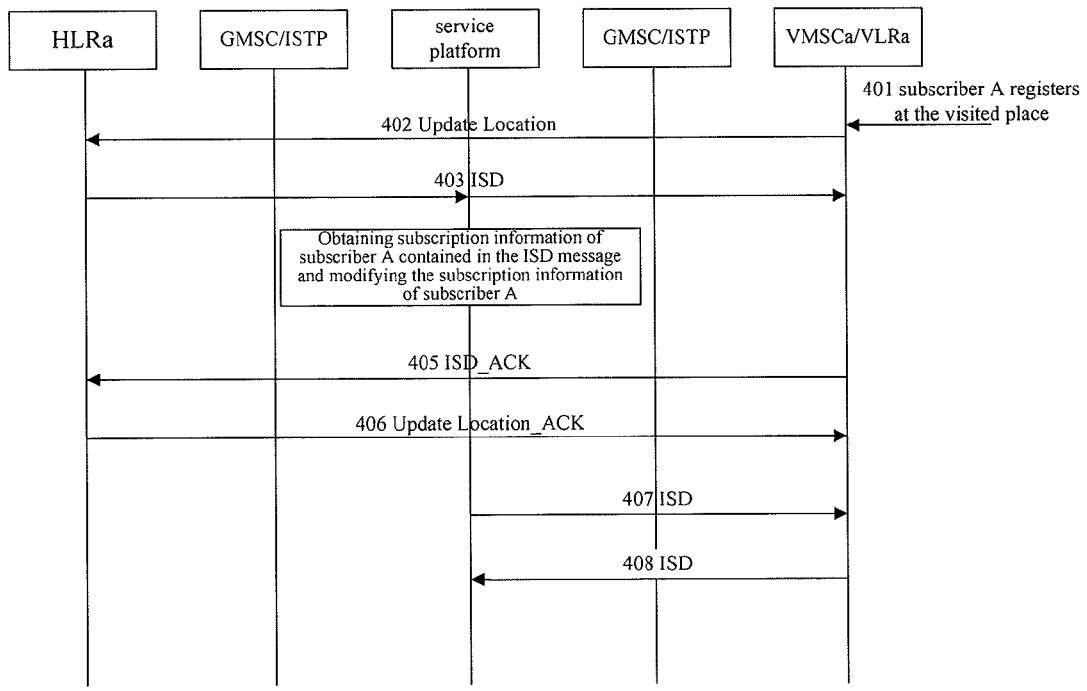
FIG. 4 schematically shows the flow of a calling method according to an embodiment of the present invention.

Referring to FIG. 4, when a prepaid Subscriber A roams to the visited location, a service platform obtains subscription information of the Subscriber A by signaling monitoring, and modifies the subscription information of the Subscriber A registered at the visited mobile switching centre. Specifically, process is performed as below.

401. Subscriber A registers at the visited mobile switching centre (VMSC)a/VLRa when roaming to the visited location.

402. VMSCa/VLRa sends an Update Location message to a home location register HLRa of Subscriber A.

403. HLRa sends an ISD (Insert Subscriber Data) message to VMSCa/VLRa.

404. The service platform monitors and detects the ISD message sent from HLRa to VMSCa/VLRa, obtains the subscriber information contained in the ISD message and modifies the subscription information contained in the subscriber information. Specifically, a SCP address (gsmSCF address) to which the service contained in the subscriber's subscription information belongs is modified to the address of the service platform so that the subscriber's subscription information points to the service platform.

405. Upon receipt of the ISD message from the HLRa, VMSCa/VLRa returns an ISD_ACK message to the HLRa.

406. HLRa receives the ISD_ACK message, and then returns an Update Location_ACK message to the VMSCa/VLRa.

407. The service platform detects the Update Location_ACK returned to the VMSCa/VLRa by the HLRa, and then sends another ISD message containing the modified subscription information to the VMSCa/VLRa.

408. VMSCa/VLRa receives the ISD message sent again from the service platform, updates the subscriber's subscription information stored therein accordingly, and returns an ISD_ACK message to the HLRa.

Figure 5:
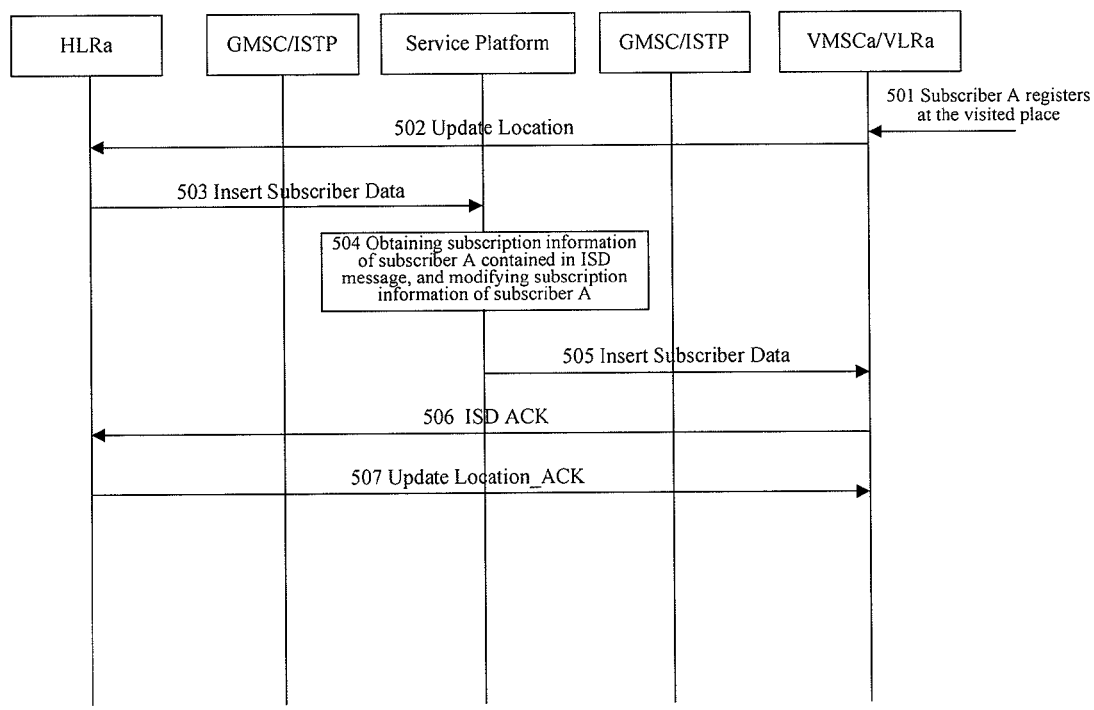
FIG. 5 schematically shows the flow of a calling method according to an embodiment of the present invention.

Alternatively, as shown in FIG. 5, the service platform may obtain the subscription information of the roaming prepaid subscriber by signaling interception, and the process of modifying the subscription information of the roaming prepaid subscriber registered at the visited mobile switching centre specifically includes as follows:

501. Subscriber A registers at the visited mobile switching centre VMSCa/VLRa when roaming to the visited location.

502. VMSCa/VLRa sends an Update Location message to Subscriber A's home location register HLRa.

503. HLRa sends an Insert Subscriber Data (ISD) message to the VMSCa/VLRa.

504. The service platform intercepts the ISD message sent from HLRa to VMSCa/VLRa, obtains the subscriber information contained in the ISD message and modifies the subscription information contained in the subscriber information. Specifically, a SCP address (gsmSCF address) to which the service contained in the subscriber's subscription information belongs is modified to the address of the service platform so that the subscriber's subscription information points to the service platform.

505. The service platform sends the modified subscription information to the VMSCa/VLRa through the ISD message.

506. The VMSCa/VLRa receives the ISD message from the HLRa, and then returns an ISD_ACK message to the HLRa.

507. The HLRa receives the ISD_ACK message, and then returns an Update Location_ACK message to the VMSCa/VLRa.

Figure 6:
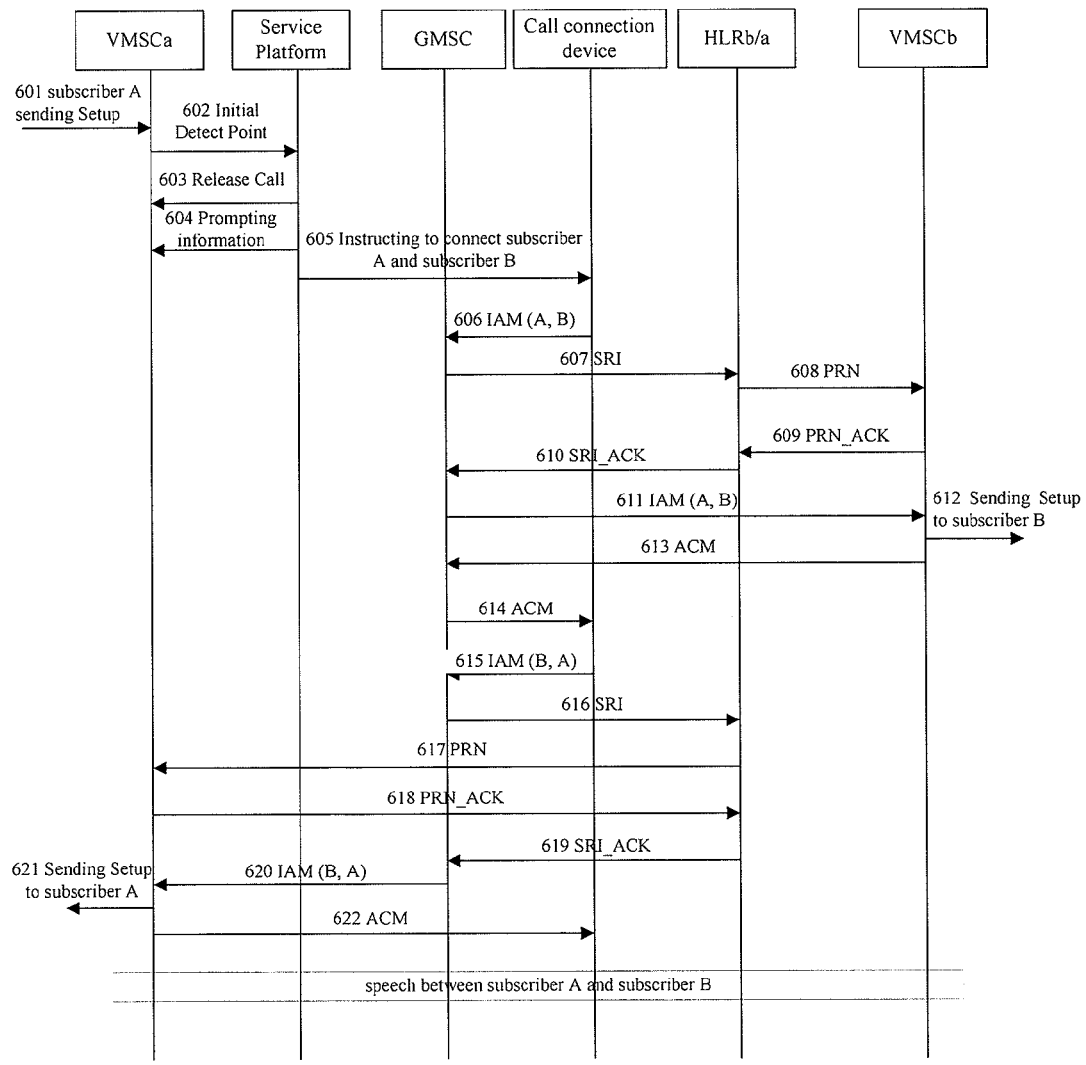
FIG. 6 schematically shows the flow of a calling method according to an embodiment of the present invention.

Next, assuming a roaming prepaid Subscriber A initiates a call to another Subscriber B. In this case, Subscriber B and Subscriber A are prepaid subscribers of the same service provider. FIG. 6 may be referred for the particular procedures:

601. Subscriber A dials a destination number B directly. The call is firstly routed to a visited mobile switching centre VMSCa/VLRa of Subscriber A, that is, Subscriber A sends a Call Setup request (setup) to VMSCa/VLRa.

602. Since the subscription information of Subscriber A held in VMSCa/VLRa points to the service platform, VMSCa/VLRa sends an Initial Detect Point (IDP) message to the service platform so as to have the call triggered to the service platform.

603. With the information on calling party and called party contained in the IDP information, the service platform determines whether the calling subscriber has subscribed to a USSD (Unstructured Supplementary Service Data) Callback (UCB) service. If so, the service platform returns a Release Call (RC) message to the VMSCa/VLRa, and the VMSCa/VLRa releases the speech path between itself and Subscriber A. If not, the process ends.

604. The service platform prompts Subscriber A with "call is connecting, please wait" by sending a USSD message, a short message, or alternatively by playing a sound to Subscriber A.

This step may be optional depending on the needs in practice. The process could be implemented without this step. That is, the service platform may sends, immediately after return a RC to the VMSCa/VLRa, a notification message to instruct IVR to connect the call between Subscriber A and Subscriber B, without prompting Subscriber A.

605. The service platform sends a notification message to instruct IVR to connect the call between Subscriber A and Subscriber B.

606. Upon receipt of the notification message from the service platform, IVR sends an Initial Address Message (IAM) (A, B) to the Gateway Mobile Switching Center (GMSC) to which the IVR belongs to instruct the GMSC to connect the call.

607. GMSC sends a Send Routing Information (SRI) message to Subscriber B's home location register HLRb.

608. Upon receipt of the SRI message, HLRb sends a Provide Remote Number (PRN) message to the visited mobile switching centre VMSCb/VLRb of Subscriber B.

609. VMSCb/VLRb allocates a Mobile Station Roaming Number MSRNb to Subscriber B, and returns the MSRNb to HLRb through a PRN_ACK message.

610. HLRb returns the MSRBb to GMSC through a routing response SRI_ACK message.

611. Upon obtainment of MSRNb of Subscriber B, GMSC sends an IAM (A, B) message to the visited MSCb/VLRb of Subscriber B based on the MSRNb to connect the call to the MSCb/VLRb.

612. Upon receipt of the IAM message, MSCb/VLRb sends a Setup Call message to Subscriber B to connect the call to Subscriber B.

613. When Subscriber B is connected, MSCb/VLRb sends an Address Complete Message (ACM) to GMSC.

614. GMSC sends an ACM message to IVR.

615. Upon receipt of the ACM message, IVR sends an IAM (B, A) message to GMSC for instructing GMSC to connect Subscriber A.

616. Upon receipt of the IAM (B, A) message, GMSC sends a SRI message to Subscriber A's home location register HLRa.

617. Upon receipt of the SRI message, HLRa sends a Provide Remote Number (PRN) message to Subscriber A's visited mobile switching centre VMSCa/VLRa.

618. VMSCa/VLRa allocates a mobile station roaming number MSRNa to Subscriber A, and returns the MSRNa to HLRa through a PRN_ACK message.

619. HLRa returns the MSRNa to GMSC through a SRI_ACK message.

620. Upon obtainment of MSRNa of Subscriber A, GMSC sends an IAM (B, A) message to Subscriber A's visited MSCa/VLRa based on MSRNa to connect the call to MSCa/VLRa.

621. Upon receipt of the IAM message, MSCa/VLRa sends a Setup Call message to Subscriber A to connect the call to Subscriber A.

622. When Subscriber A is connected, MSCa/VLRa sends an Address Complete Message (ACM) message to GMSC.

623. The call is activated between the calling and called parties.

Alternatively, in this embodiment, in step 605, IVR may connect Subscriber A first and then connect Subscriber B, after the service platform sending a notification message to instruct IVR to connect the call between Subscriber A and Subscriber B.

In the above embodiments of the present invention, the service platform monitors or intercepts the Update Location information of the subscriber, obtains and modifies the subscriber's subscription information. Therefore when a subscriber roams to a visited location and initiates a call, the subscriber simply dials the called number directly, and then the call will be triggered to the service platform according to originating subscription information, a callback service will be achieved by the service platform. In such a way, the operations are simple and convenient while the user's experience is improved.

It should be understood by those skilled in this art that steps of each method of the above embodiments, as a whole or in part, can be implemented by a program instructing relevant hardware. The program may be embodied on one or more computer readable storage medium. Examples of the computer readable storage medium may include ROM, RAM, magneto disk or optical disk.

Apparently, it is possible for persons skilled in the art to make various variations and modifications to the present invention without departing from the principles and scopes of the present invention. Accordingly, the present invention is intended to cover such variations and modifications provided that they fall within the scope of the claims and equivalents thereof.

The invention claimed is:

1. A calling method comprising:
   receiving, by a Home Location Register (HLR) of a roaming prepaid subscriber, a update location message from a Visited Mobile Switching Centre (VMSC) of the roaming prepaid subscriber;
   sending, by the HLR, an Insert Subscriber Data (ISD) message to the VMSC;
   obtaining, by a service platform, subscription information of the roaming prepaid subscriber from the ISD message;
   modifying, by the service platform, a Service Control Point (SCP) address contained in the subscription information to the address of the service platform;
   sending, by the service platform, the modified subscription information to the VMSC;
   receiving, by the VMSC, a call to a called subscriber initiated by the roaming prepaid subscriber;
   triggering, by the VMSC, the call to the service platform according to the address of the service platform;
   receiving, by the service platform, the call;
   determining from the call that the roaming prepaid subscriber has activated a callback service; and
   instructing, by the service platform, the VMSC to release the call, and instructing a call connection device to connect the roaming prepaid subscriber to the called subscriber.

2. The method according to claim 1, wherein:
   the service platform monitors the ISD message; and sends the ISD message containing the modified subscription information to the VMSC.

3. The method according to claim 1, wherein:
   the service platform intercepts the ISD message;
   and sends the ISD message containing the modified subscription information to the VMSC, in place of the intercepted ISD message.

4. The method according claim 1, after determining from the call that the roaming prepaid subscriber has activated a callback service, the method further comprising:
   prompting, by the service platform, the roaming prepaid subscriber that the call is connecting.

5. The method according to claim 4, wherein prompting the roaming prepaid subscriber that the call is connecting comprises:
   sending, by the service platform, one of a USSD message and a short message to the roaming prepaid subscriber to prompt the roaming prepaid subscriber that the call is connecting.

6. The method according to claim 4, wherein prompting the roaming prepaid subscriber that the call is connecting comprises:
   playing, by the service platform, a sound to the roaming prepaid subscriber to prompt the roaming prepaid subscriber that the call is connecting.

7. A calling system, comprising:
   a Home Location Register (HLR) of a roaming prepaid subscriber, configured to:
      receive an update location message from a Visited Mobile Switching Centre (VMSC) of the roaming prepaid subscriber, and
      send an Insert Subscriber Data (ISD) message to the VMSC;
   a service platform configured to:
      obtain subscription information of the roaming prepaid subscriber from the ISD message, modify a Service Control Point (SCP) address contained in the subscription information to the address of the service platform, send the modified subscription information to the VMSC, so that a call initiated by the roaming prepaid subscriber could be triggered to the service platform by the VMSC,
      receive the call to a called subscriber initiated by the roaming prepaid subscriber and triggered by the VMSC,
      determine from the call that the roaming prepaid subscriber has activated a callback service, and
      instruct the VMSC to release the call initiated by the roaming prepaid subscriber, and instruct a call connection device to connect the roaming prepaid subscriber to the called subscriber;
   a visited mobile switching centre (VMSC) of the roaming prepaid subscriber configured to:
      receive the call to a called subscriber initiated by the roaming prepaid subscriber, trigger the call to the service platform according to the address of the service platform, and
      release the call according to an instruction received from the service platform.

8. The system according to claim 7, further comprising:
   a call connection device configured to establish callback calls for the roaming prepaid subscriber and the called subscriber respectively according to the instruction received from the service platform.

* * * * *